US 6,533,916 B1

(12) United States Patent
Puetter et al.

(10) Patent No.: US 6,533,916 B1
(45) Date of Patent: Mar. 18, 2003

(54) DIAMOND ELECTRODES

(75) Inventors: Hermann Puetter, Neustadt (DE); Andreas Weiper-Idelmann, Waldsee (DE); Claudia Merk, Limburgerhof (DE); Matthias Fryda, Braunschweig (DE); Claus-Peter Klages, Braunschweig (DE); Lothar Schaefer, Meine (DE); Alexander Hampel, Braunschweig (DE)

(73) Assignees: BASF Aktiengesellschaft, Ludwigshafen (DE); Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 09/523,723

(22) Filed: Mar. 13, 2000

(30) Foreign Application Priority Data

Mar. 16, 1999 (DE) .......................... 199 11 746

(51) Int. Cl.⁷ ............................... C23C 28/00
(52) U.S. Cl. ...................... 205/188; 205/210; 205/212; 205/229; 205/316; 205/322; 204/290.01; 204/294
(58) Field of Search ............................ 204/290.01, 294; 205/188, 210, 212, 229, 316, 322

(56) References Cited

U.S. PATENT DOCUMENTS

| | | | |
|---|---|---|---|
| 5,399,247 A | | 3/1995 | Carey et al. ................. 204/131 |
| 5,776,323 A | | 7/1998 | Kobashi ..................... 204/294 |
| 5,900,127 A | * | 5/1999 | Iida et al. ................. 204/290.01 |
| 6,161,499 A | * | 12/2000 | Sun et al. ................... 427/294 |

FOREIGN PATENT DOCUMENTS

| | | |
|---|---|---|
| DE | 196 03 093 | 7/1997 |
| JP | 09-13188 | 1/1997 |

OTHER PUBLICATIONS

Chemical Abstract, Ramesham et al., "Kinetic studies of hydroquinone/quinone at the boron–doped diamond electrode by cyclic Boltammetry", XP–002142755, AN –128:54601, 1997.
Franz Wenisch et al. "Experiences With An Undivided Cell", *Electroorganic Synthesis Technology, AIChE Symposiom Series*, No. 185, vol. 185, No. 75, 1979, pp. 69–75.
Heinz Nohe, "Comparison of Conventional and Electro–Organic Processes", *Electroorganic Synthesis Technology, AIChE Symposiom Series*, vol. 185, no. 75, 1979, pp. 69–75.
D. Degner et al., "Electrochemistry III", *Organic Electrosynthesis in Industry, Topics in Current Chemistry*, vol. 148, 1988, pp.3–95.

* cited by examiner

Primary Examiner—Bruce F. Bell
(74) Attorney, Agent, or Firm—Oblon, Spivak, McClelland, Maier & Neustadt, P.C.

(57) ABSTRACT

An electrode consisting of a substrate and a diamond layer applied to the substrate, in which the applied diamond layer is pore-free, and a process for producing a diamond-coated electrode, in which the process comprises at least the following steps:

a) cleaning the surface of the substrate;
b) seeding the surface of the substrate with a high diamond nucleation density;
c) coating the surface of the substrate with diamond.

26 Claims, No Drawings

DIAMOND ELECTRODES

The present invention relates to diamond-coated electrodes, termed diamond electrodes below for short, which can be used in reactions of organic compounds, and to a process for producing such diamond electrodes.

Carbon electrodes, such as graphite or recently also glassy carbon, are known in electrochemistry and are used industrially on account of their relatively good electrical conductivity. Diamond, as a further modification of carbon, on account of its rare occurrence and its properties as an insulator, was previously of no great importance in industrial use.

However, in the interim, it has been found that particularly modified diamond electrodes behave similarly to the conventional graphite electrodes in reactivity and selectivity in organic solvents, such as methanol, THF, DMF or acetonitrile. In this respect, the advantages of the diamond-coated electrodes can be made utilizable. This is especially the inert chemical behavior toward aggressive chemicals (e.g. hydrogen fluoride). Moreover, diamond electrodes have the advantage that a broad potential range can be used, in water for example in a range of from −1.2 V to 2.3 V, without the solvent being attacked. In addition to the advantages of diamond compared with graphite, the disadvantages of graphite may also be eliminated by using diamond electrodes. These are, firstly, the mechanical disadvantages of graphite, for example abrasion and swelling of the noncrystalline layers, secondly the chemical disadvantages, for example corrosion, especially with respect to water, intercalation of organic material into the graphite layers, the layer lattice expansion on hydrogenation and the possible oxidation of the graphite. In the reaction of organic compounds, hitherto predominantly graphite electrodes have been used. Thus, for example, in a capillary cell which was developed by Beck and Guthke in 1969, electrochemical oxidations were carried out on graphite electrodes, such as for example the methoxylation of furan to dimethoxydihydrofuran, or the Kolbe electrolysis of adipic monoesters to form 1,10-sebacic esters. However, when graphite is used, due to the rough surface and the graphite abrasion during the electrolysis, graphite particles can lead to short circuits. Graphite blocks covered with metal foils have proved to be insufficiently stable. The metal foils become wavy and flake off (F. Wenisch, H. Nohe, H. Hannebaum, D. Degner, R. K. Horn, M Stroezel, *AIChE Symposium Series* 75, (1979) 14; H. Nohe, *AIChE Symposium Series* 75, (1979) 69). In addition, numerous oxidations of aromatics at graphite are known (D. Degner, *Topics in Current Chemistry* 148, 1988, 3–95). U.S. Pat. No. 5,399,247 discloses the decomposition of organic compounds in waste water using diamond electrodes. According to this patent, the decomposition of aqueous organic residue components, for example hydroquinone, proceeds very readily. Phenol may also be decomposed very readily at diamond electrodes. For the preparative synthesis of organic compounds, diamond electrodes have not been used hitherto, however. This was due to the fact, inter alia, that it has not been possible hitherto to coat sufficiently large areas of electrode surfaces with diamond. In addition, the layers have not been stable enough hitherto in organic solvents.

The principal areas of use of diamond layers have hitherto been in machine tool construction, or in the case of electrically conductive diamond layers, in the sensor sector also. In electrochemistry, they are also being used as electrode material, for example for its reducing nitrate to ammonia.

U.S. Pat. No. 5,399,247 describes, as mentioned briefly above, for example the use of diamond electrodes for decomposing industrial waste waters, as exemplified by photographic developer baths. JP 09013188 relates to the use of oxidation, reduction and halogenation for modifying the surfaces of diamond electrodes.

In addition, there are numerous studies on diamond electrodes with analytical application for cyclic voltammetry (CV). Here, the diamond electrodes require only a very small area of about 10 mm$^2$ or wires having a length in the mm region and also only a very thin diamond layer obtained by simple coating. In this case use is made of the property of passivating the coated metal in water, this metal generally being titanium. In organic media, even with low water contents, such a passivation does not succeed. In this respect the electrodes are not sufficiently resistant to aggressive materials. This type of diamond electrode was thus not suitable for use in reactions of organic compounds. This case requires extensive virtually pore-free dense diamond layers on the corresponding support electrodes.

With respect to producing diamond layers, in parallel to the high-pressure/high-temperature synthesis (HPHT synthesis), low-pressure processes for producing diamond have also been developed, which were firstly considered uneconomic and not pursued further. Based on this early work, in the 1980s, activated gas-phase deposition processes (chemical vapor deposition, CVD) for synthesizing diamond layers were developed up to market readiness.

It is an object of the present invention, in view of the above prior art, to provide a diamond electrode which is suitable for using in reactions of organic compounds, and to provide a process for its production.

We have found that this object is achieved by a diamond electrode and a process for its production as defined in the independent claims. Expedient developments are specified in the subclaims.

Accordingly, the present invention relates to a process for producing a diamond-coated electrode, in which the process comprises at least the following steps:

a) Cleaning the surface of the substrate;
b) Seeding the surface of the substrate at a high diamond nucleation density;
c) Coating the surface of the substrate with diamond.

This procedure prevents or substantially suppresses the formation of pores in the diamond layer. Pores occurred in previously known coatings with diamond in comparatively high numbers. Pores of this type are formed in the coating process by contaminants on the surface to be coated. The diamond layer cannot grow over these areas, so that uncoated and thus corrosion-susceptible areas are present on the surface of the substrate to be coated.

Only now by the seeding according to the invention at a high diamond nucleation density and preferably repeated coating, i.e. performed at least twice, of the surface of the substrate with diamond (step c)), coupled with an adequate cleaning procedure prior to each coating step has it become possible to create an adequate extensive, pore-free and dense diamond layer on the surface of the corresponding substrate and thus to create an electrode suitable for use in the reaction of organic compounds. B y means of th e process of the invention it is possible to produce area in the range from 3000 to 300,000 mm$^2$, further preferably from 10,000 to 300,000 mm$^2$ For the purposes of the invention, pore-freeness means that no pore is detectable. The porosity is monitored by applying hydrofluoric acid to the diamond layer produced, in which case if pores are present, considerable hydrogen formation would occur instantaneously. By means of the process of the invention, diamond layer thicknesses for industrial electrode materials are produced in a range from 1 µm to 50 µm. In the case of silicon electrodes, diamond layers having a thickness of from 0.25 µm to 10 µm are possible.

Preferably, in the case of smooth electrode surfaces, the electrode substrate, prior to the first cleaning step, is preferably mechanically roughened. This is preferably performed by sandblasting, preferably at a pressure of from 5 to 7 bar. This roughening of the surface initially achieves a very good anchoring of the diamond layer still to be applied. When graphite is used for the substrate, in contrast, roughening is not necessary, since here even in the initial state, sufficient roughness is present. A certain roughness is necessary to achieve sufficient bonding strength. The mechanical anchoring given as a result is necessary especially in the case of materials having a high thermal expansion coefficient.

The surface of the substrate is then cleaned, for example to remove grains of sand. This is preferably performed by means of ultrasonic treatment in an organic solvent, preferably for about 30 minutes. The cleaning is necessary in principle and serves to condition the surface of the electrode for the subsequent coating. These are processes known in coating technology which are adapted in each case to the coating and the substrate material.

As preparation for the coating, the surface of the substrate is then treated with diamond powder, i.e. seeded. To achieve pore-freeness, even with small layer thicknesses, a nucleation density as high as possible leading to dense diamond growth is required. In this case, seeding is performed according to the invention at a diamond nucleation density $\geq 10^{10}/cm^2$, preferably at a diamond nucleation density which is in a range from $10^{11}/cm^2$ to $10^{13}/cm^2$. This is preferably achieved by firstly the seeding producing a high initial nucleation density on the surface and secondly a process procedure being chosen in the initial phase which prevents dissolution of the generally very small nuclei by diffusion into the substrate, by reaction with the substrate, for example by carbide formation, and by reaction with the gas phase, for example by etching due to the atomic hydrogen present in the gas phase. In a preferred embodiment of the invention, it is achieved by seeding with nanodiamond powder in the range from 5 nm to 100 nm. In addition, seeding with nanodiamond powder is preferably performed in a suspension with organic solvents, preferably ethanol. This is, moreover, performed in a preferred embodiment of the invention in an ultrasonic bath by spraying and/or by applying with a spin coating process.

Preferably, the initial phase is as short as possible up to the beginning of diamond growth. This is preferably achieved according to the invention by the substrate not coming into contact with the activated gas phase until the coating temperature of from 500° C. to 950° C., preferably from 750° C. to 850° C., is achieved. This is possible either by auxiliary heating of the substrate or by using shutters to separate substrate and activated gas phase. Preferably, after the seeding, the surface of the substrate is again cleaned before the actual coating of the surface of the substrate with diamond then occurs. In some cases, the surface of the substrate is cleaned again after the first coating step, preferably with alcohol, in particular with ethanol, for about 10 minutes in an ultrasonic bath. For industrial and extensive substrates this is because it is expected that, owing to the fabrication conditions, residual impurities remain on the surface despite the cleaning. Only then is a second step of coating the surface of the substrate with diamond carried out.

However, it must be stated that a wet-chemical cleaning step after the 1st coating is not absolutely necessary. Instead, preferably a 2nd seeding step is carried out. Firstly, owing to the seeding with the suspension, cleaning of the surface takes place. Secondly, when ultrasonic baths are used, all particles leading to pores are mechanically removed. The additional seeding also ensures that all sites over which diamond has not yet grown are provided with diamond nuclei for the second coating process.

The coating according to the invention, preferably performed at least twice, of the surface of the substrate with diamond then achieves the pores which still remain after the first coating being sealed with diamond and thus a diamond layer which is detectably pore-free is obtained. In the case of polished surfaces and low-dust surroundings, it is conceivable, however, that a single coating operation is sufficient to achieve pore-freeness. This can apply in particular to silicon.

Preferably, step b) is repeated at least once, particularly preferably a multiplicity of times, prior to each repetition of step b) the surface of the substrate being cleaned, i.e. abraded or polished. By this means a very high nucleation density is achieved on the surface of the substrate. This nucleation density can be further increased by seeding the surface of the substrate preferably with a diamond powder whose grain size is in the nanometer range. Preferably, the range extends from 5 nm to 75 µm, particularly preferably from 0.25 µm to 3 µm. The sealing is preferably performed in this case in a suspension of the nanodiamond powder in ethanol in an ultrasonic bath with subsequent cleaning in alcohol, preferably in ethanol. In addition, additional application of a bias voltage to the surface to be coated can cause a sufficient number of diamond nuclei to be deposited on the surface of the substrate.

Preferably, the subsequent coating of the surface of the substrate is carried out using the CVD process already mentioned in the introduction, further preferably using the hot-wire CVD process. In order to achieve a high activation of the gas phase for the coating process, the filament temperatures of preferably from 2000° to 2400° C. must be achieved. This process step is carried out according to the invention preferably at a pressure of from about 10 to 100 mbar, particularly preferably from 10 mbar to 40 mbar. The filament spacings are chosen so that a very uniform temperature distribution is obtained. As mentioned above, to ensure pore-freeness within the context of the present invention, the coating process, i.e. step c) is repeated at least once, preferably a multiplicity of times, between these repetitions a cleaning step being carried out in each case. After each cleaning step according to step c) of the process according to the invention, after cooling, the pressure in the coating chamber is preferably increased to atmospheric pressure. The pressure increase removes loose particles from the surface of the substrate. By means of the repeated coating according to the invention, the few pores still remaining are sealed.

In a preferred embodiment of the process, the substrate comprises a core and an intermediate layer applied to the core, to which intermediate layer, in turn, the diamond layer is applied. The core in this case preferably consists of one or more of the following substrates, that is to say graphite and/or silicon (Si) and/or gold and/or titanium (Ti) and/or molybdenum (Mo). For the intermediate layer, preferably gold and/or platinum and/or chromium is used. In comparison with gold, platinum has the advantage that the diamond layer to be applied can be applied at higher temperatures, which in turn causes improved phase purity and generally a higher deposition rate of the diamond layer. These intermediate layers serve as a diffusion barrier for the various carbon modifications occurring on the surface and simultaneously also offer improved bonding for the diamond layer to be applied. The surface reactions occurring depend, however, in addition to the surface composition, in a sensitive manner on the surface temperature. The maximum substrate temperature is in the range below 950° C., depending on the materials to be coated. In the case of Ti, it is, for example, $\leq 750°$ C., in the case of Au$\leq 850°$ C. and in the case of Ta$\leq 950°$ C. When the hot-wire CVD process is used for coating with diamond, an upper limit of 950° C. is caused by the fact that the CVD diamond deposition decreases greatly and, at temperatures above 1100° C., no longer takes place. According to the invention, the filament diameter and the filament spacings and the distance between the respective filaments and the substrate are optimized or matched to the experimental conditions.

In another preferred embodiment of the process of the invention, metal is used for the substrate, preferably a carbide-forming metal or silicon (Si). When carbide-forming metals are used, it is not necessary to additionally apply an intermediate layer. During the coating with diamond, a carbide layer first forms, on which in turn the diamond is deposited. This all proceeds in one process step. The carbide layer formed between metal layer and diamond layer reinforces the bonding of the diamond layer. Silicides, borides and carbides, for example silicon carbide, can alternatively be used here.

In a further preferred embodiment of the process according to the invention, the boron content of the diamond layer is variable. Whereas, previously, there was interest in depositing very high boron homogeneous diamond layers to maximize the conductivity of the diamond layer, it has now been found that the boron content significantly influences the redox window of the diamond electrodes, more precisely in such a manner that the boron content considerably decreases the redox window. Therefore, the boron content according to the invention is kept variable and at the same time is chosen to be as low as possible. It can be varied from 10 ppm to 10,000 ppm. Preferably, boron contents are used from 10 ppm to 2000 ppm, particularly preferably from 50 ppm to 1000 ppm. In the coating process according to the invention preferably trimethyl borate is added in an amount such that the ratio to methane does not exceed 1:1.

In a further preferred embodiment of the process according to the invention, the substrate surface to be coated is arranged vertically during the process of producing the diamond layer on the substrate. It prevents the accumulation of particles falling onto the substrate during the deposition, for example of coatings on the reactor wall which flake off. As a result, in addition to the repeated coating according to the invention, likewise the pore-freeness within the meaning of the invention may be optimized.

The invention also relates to an electrode which has a substrate and a diamond layer applied to the substrate, the diamond layer applied being pore-free. The substrate in this case preferably has one or more of the following materials: carbides, suicides and borides. In another preferred embodiment, the substrate consists of a metal or silicon, particularly preferably of a carbide-forming metal.

In a further preferred embodiment of the electrode according to the invention, the substrate comprises a core and an intermediate layer applied onto the core. The core in this case preferably comprises graphite or titanium or molybdenum or gold or a combination of two or more thereof. In a preferred embodiment, the intermediate layer applied onto the core consists of gold or platinum or a mixture of gold and platinum.

In a preferred embodiment of the electrode according to the invention, the boron content of the diamond layer is relatively low. Preferably, it is in a range from ppm to 2000 ppm, in particular from 50 ppm to 1000 ppm.

The thickness of the diamond coating of the electrode according to the invention is preferably in a range of from 1 to 50 $\mu$m, further preferably from 1 to 10 $\mu$m.

In addition, the present invention relates to a process for the electrochemical reaction of at least one organic compound, the at least one organic compound being brought into contact with an electrode according to the invention or an electrode which has been produced by a process according to the invention. The invention, with respect to forms of the reaction, relates preferably to oxidations and/or reductions and/or electrochemical funcationalizations of organic compounds or mixtures of two or more organic compounds. Examples in this case are in particular halogenations, acetoxylations and methoxylations.

It is necessary according to the invention that at least one of the electrodes used is a diamond electrode according to the present invention. Preferably, not only the cathode but also the anode is a diamond electrode according to the present invention.

If an embodiment is chosen in which only one diamond electrode according to the present invention is used, the other electrode can be selected freely with respect to the material used and its form, as a function of the reaction and the chemistry present. The material which can be used for an electrode not according to the invention can generally be perforated materials, such as gauzes, expanded metal sheets, lamellae, profiled webs, gratings and smooth sheets. Perforated materials of this type are preferably also used for the substrate of the diamond electrode according to the invention. In the case of a plane-parallel electrode arrangement, this is achieved in the form of planar surfaces, in the embodiment having candle-shaped electrodes, in the form of a cylindrical arrangement.

The choice of the material of the other electrode or its coating is dependent on the solvent of the anolyte and/or catholyte. Thus in organic systems, graphite electrodes are preferably used, whereas in water-containing systems, preferably materials or coatings having a low oxygen overpotential. For acetic anolytes, in this case, examples are titanium supports or tantalum supports having electrically conducting intermediate layers onto which electrically conductive mixed oxides of subgroups IV to VI are applied which are doped with metal or metal oxides of the platinum group. In the case of basic anolytes, iron anodes or nickel anodes are preferably used. In the case of the cathodes, in organic systems, graphite, stainless steel, platinum or nickel are also preferred. In water-containing systems, preferably, copper, zinc, nickel, lead, stainless steel, platinum and graphite are used as cathode material.

In the context of the process of the invention, the type of cell used, and the shape and arrangement of the electrodes do not have a critical influence, so that in principle all cell types customary in electrochemistry can be used.

The two following apparatus variants are examples:

a) Undivided Cells

Undivided cells having a plane-parallel electrode arrangement are preferably used in neither starting materials nor products which are produced or reacted at the anode or cathode are modified or react with one another in an interfering manner by the respective other electrode process. Preferably, the electrodes are in a plane-parallel arrangement, because in this embodiment an homogeneous current distribution is given with a small electrode gap (from 0.5 mm to 30 mm, preferably from 1 to 10 mm). Preferably in this case the electrodes can be used individually or stacked in a plurality. In the latter case, this is the use of electrode stacks, which can be connected together in series in a bipolar manner in the stacked plate cell and one or both surfaces of the individual stack unit can be coated with diamond.

b) Divided Cells

Divided cells having a plane-parallel electrode arrangement or candle-shaped electrodes are preferably used when the catholyte must be separate from the anolyte, in order to exclude, for example, chemical side reactions or to simplify the subsequent separation. of substances. The separating medium used can be ion-exchange membranes, microporous membranes, diaphragms, filter gauze of nonelectronconducting materials, glass frits and porous ceramics. Preferably, ion-exchange membranes, in particular cation-exchange membranes, are used, of these, in turn, those membranes preferably being used which consist of a copolymer of tetrafluoroethylene and a perfluorinated monomer which contains sulfo groups. Preferably, in the case of divided cells, the electrodes are also arranged to be plane-parallel, since in this embodiment an homogeneous current distribution is given with small electrode gaps (two gaps each of from 0 mm to 10 mm, preferably at the anode from 0 to 3 mm, at the cathode from 0 to 3 mm).

In the process according to the invention, for the electrochemical reaction, it is preferred that the voltage is in the range from 1 to 100, preferably from 2 to 50, and particularly preferably from 4 to 15 V. It is advantageous if, in the process for the electrochemical reaction, the voltage is selected in such a manner that the current density is in the range from 1 to 50, preferably from 5 to 20, and particularly preferably from 8 to 13, mA/cm$^2$.

The electrochemical reaction according to the invention is preferably carried out in a temperature range from 0 to 100, preferably from 10 to 70, and particularly preferably from 15 to 55° C.

Furthermore, it has proved to be useful in the electrochemical reaction according to the invention to use a charge quantity in the range from 1 to 10, preferably from 2 to 7, and particularly preferably from 3 to 6 F.

Generally, the reaction according to the invention is performed in the presence of an auxiliary electrolyte. The addition of same serves to set the conductivity of the electrolysis solution and/or to control the selectivity of the reaction. The content of the electrolyte is generally at a concentration of from approximately 0.1 to approximately 10, preferably from approximately 0.2 to approximately 5% by weight, further preferably from approximately 0.5 to approximately 4% by weight, in each case based on the reaction mixture. Suitable auxiliary electrolytes are proton acids, for example organic acids, of which examples are methylsulfonic acid, benzenesulfonic acid or toluenesulfonic acid, and mineral acids, for example sulfuric acid and phosphoric acid. In addition, neutral salts can also be used as auxiliary electrolytes. Suitable cations in this case are metal cations of lithium, sodium, potassium, but also tetralkylammonium cations, for example tetramethylammonium, tetraethylammonium, tetrabutylammonium and dibutyldimethylammonium. Examples of anions are: fluoride, tetrafluoroborate, sulfonates, for example methylsulfonate, benzenesulfonate, toluenesulfonate, sulfates, for example sulfate, methyl sulfate, ethyl sulfate, phosphates, for example methyl phosphate, ethyl phosphate, dimethyl phosphate, diphenyl phosphate, hexafluorophosphate, phosphonates, for example methyl methylphosphonate and methyl phenylphosphonate.

In addition, basic compounds can also be used, for example alkali metal hydroxides or alkaline earth metal hydroxides, alkali metal carbonates, hydrogen carbonates and alkoxides, or alkaline earth metal carbonates, hydrogen carbonates and alkoxides, with methoxide, ethoxide, butoxide and isopropoxide preferably being used as alkoxide anions.

Suitable cations in these basic compounds are again the abovementioned cations.

The process of the invention can be carried out not only using an homogeneous solution of the organic compound to be reacted in a suitable solvent but also in a two-phase system consisting of one phase containing at least one organic solvent, as defined below, and the organic compound to be reacted, and a second, water-containing phase, or else solvent-free.

Single solvents or solvent mixtures can be used as solvents. Suitable solvents are all protic solvents, i.e., solvents which contain protons or can release protons and/or solvents which can form hydrogen bonds, for example alcohols, amines, carboxylic acids etc., if appropriate in a mixture with aprotic polar solvents, for example tetrahydrofuran, acetonitrile or the latter as sole solvent. Preferably, on account of the conductivity to be maintained, lower alcohols such as methanol, ethanol, 1-propanol, isopropanol, 1-butanol, sec-butanol or tert-butanol, ethers, such as diethyl ether, 1,2-dimethoxyethane, furan, tetrahydrofuran and dimethylformamide are used. In addition, water can be admixed to the solvents, if appropriate a mixture with one or more of the abovementioned alcohols, ethers, DMF being used, a mixture of water with methanol, THF, dimethoxyethane or DMF being preferred. In addition to these alcohols, the corresponding acids can also be used, preferably fatty acids, for example formic acid, acetic acid, propionic acid, butyric acid, valeric acid, caproic acid, oenanthic acid, caprylic acid, pelargonic acid, capric acid, undecanoic acid, lauric acid, tridecanoic acid, myristic acid, pentadecanoic acid, palmitic acid, margaric acid, stearic acid, nonadecanoic acid, isobutyric acid, isovaleric acid.

The electrochemical reaction of the invention can be carried out either continuously or batchwise.

Organic compounds which can be used as starting materials in the process of the invention are in principle all organic compounds containing electrochemically reactive, in particular oxidizable, reducible and functionizable groups. In this case the products. which can be obtained, depending on the total amount of current supplied, can be not only partially reacted compounds but also completely reacted compounds, i.e., for example, completely or partially reduced or oxidized compounds. Thus, for example, starting from an alkyne, the corresponding alkene can also be obtained, as can the corresponding completely reduced alkane.

Electrochemical reactions preferred according to the invention are oxidation or reduction. Among these reactions, particular preference is given to arylation, alkynylation and the formation of alcohols, ethers, ketones, aldehydes, carboxylic acids, esters, olefins, amides and oxoamides. In addition, preference is given to halogenation, in particular fluorination, chlorination, bromination and particular preference is given to chlorination.

The process of the invention can reduce in particular the following classes of organic compounds:

Organic compounds which have at least one C—C double bond, for example unsaturated carboxylic acids, aromatic compounds which are substituted by one or more alkenyl groups.

Organic compounds which have at least one C—C triple bond. Organic compounds which have at least one aromatic $C_6$ ring, for example all aromatic monocyclic or polycyclic hydrocarbons and monocyclic substituted aromatic compounds, in particular substitution with halogen, alkyl, acyl and/or alkoxy being preferred.

Organic compounds which have at least one heterocyclic ring, for example 5-, 6-or higher-membered, unsaturated heterocycles which contain from 1 to 3 nitrogens and/or one oxygen or sulfur.

Organic compounds which have at least one structural unit C=X, where X can be an $NR_1$ group, oxygen and/or sulfur, where $R_1$ can be an alkyl group, an aryl group, an alkoxy group, hydrogen or a hydroxyl group. The above definition comprises all organic compounds which have at least one carbon-heteroatom double bond, for example aldehydes, ketones and the corresponding thio compounds and imines.

Organic compounds which have at least one C—N triple bond, for example dinitriles and mononitriles.

Organic compounds which have a structural unit C—Z. This definition comprises all organic compounds which have halogens, in particular chlorine, bromine and/or iodine or an oxialkyl group, for example saturated hydrocarbons or aromatic hydrocarbons which are substituted by at least one of the abovementioned groups.

A further process preferred according to the invention is the oxidation of aromatics such as substituted benzenes, substituted toluenes and substituted or unsubstituted napthalenes. Quite generally, aromatics of the formula below may be reacted:

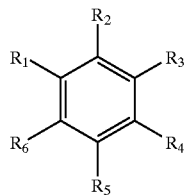

where R1, R2, R3, R4, R5 and R6 each independently of one another can be H; alkyl; aryl; OR, where R=H, alkyl, aryl, CO—R', where R'=alkyl and aryl; COOR, where R=H, alkyl or aryl; COR, where R=alkyl or aryl, nitro; F, Cl, Br, I; CONR'R", where R' and R" can be alkyl, aryl and alkyloxymethylene or aryloxymethylene and alkyloxyethylene or aryloxyethylene; NR'R", where R' and R"=H, alkyl, aryl and alkyloxymethylene or aryloxymethylene and alkyloxyethylene or aryloxyethylene; in addition, R1 and R2 or R4 and R5 can be part of a further condensed ring system which can be aromatic of heteroaromatic. The alkyl chains can be branched or unbranched. In this embodiment, particular preference is given to processes for alkoxylation, preferably methoxylation, of 4-methoxytoluene, p-xylene, p-tert-butyltoluene, 2-methylnaphthalene, anisole or hydroquinone dimethyl ether. Further preference is given to the reaction of toluene derivatives and benzene derivatives, for example chlorobenzene, 1,2-dichlorobenzene, 1,3-dichlorobenzene, 1,4-dichlorobenzene and similarly the fluorinated, brominated and iodinated benzenes. Other substrates are fluoro-, chloro-, bromo- and iodotoluenes, which can be ortho-, meta- and para-substituted, and also nitrobenzenes or nitrotoluenes, in particular nitrobenzene, m-, o-, p-dinitrobenzene, m-, o-, p-nitrotoluene, 2,4- and 2,6-dinitrotoluene or monoacetyl-or bisacetyl-substituted toluenes and benzenes.

The abovementioned organic compounds can also be acyloxylated by the process for the electrochemical reaction.

Another preferred process for the electrochemical reaction relates to the anodic dimerization of substituted and unsubstituted benzenes, toluenes and naphthalenes, where the abovementioned organic compounds are preferably substituted by $C_1$- to $C_5$-alkyl chains. Advantageously, the process of the invention can also be used for alkoxylation, preferably methoxylation or hydroxylation of carbonyl compounds, in particular of cyclohexanone, acetone, butanone or substituted benzophenones.

Another preferred process is the oxidation of alcohols or carbonyl compounds to carboxylic acids, for example of butanediol to acetylenedicarboxylic acid or of propargyl alcohol to propiolic acid.

In addition, preference is given to the Kolbe reaction, the electrochemical decarboxylation of aliphatic carboxylic acids for the coupling of the carboxylic acid residues for the synthesis of alkanes; in addition for the synthesis of alcohols, ethers and free-radical-induced compounds. Another preferred process is the reaction of open-chain and cyclic hydrocarbons, in order to obtain the products which are methoxylated and double-methoxylated in the allyl position, particular preference here is given to the synthesis of cyclohex-2-enyl methyl ether or 1,1-dimethoxy-2-cyclohexane, starting from cyclohexane.

The process can advantageously also be used to functionalize amides. Particularly suitable amides are shown in the formula (I)

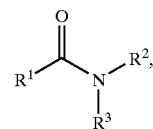

where $R^1$ is a branched-chain or linear $C_1$-$C_{20}$-alkyl, $C_1$-$C_{20}$-cycloalkyl, arylkyl group and $R^2$ or $R^3$ independently of one another are a $C_1$-$C_{20}$-alkyl group. Alkoxylation is the most preferred functionalization. Particularly preferably, dimethylformamide is reacted to form N-monomethoxymethyl-N-methylformamide.

In addition, the process of the invention for electrochemical reaction is also suitable for the oxidation, reduction or functionalization of heterocycles. Preferred heterocycles have from 3 to 7, preferably from 4 to 6, and particularly preferably from 4 to 5, carbon atoms. The heterocycles can have from 1 to 3, preferably from 1 to 2, and particularly preferably 1, hetero group or hetero atom. Preferred hetero groups or hetero atoms are those which have NH, O and S. In addition it is preferred that the heterocycles have at least one double bond, preferably two double bonds. In addition, the heterocycles may be substituted, where halogens and $C_1$-$C_{20}$-alkyl groups are particularly preferred substituents. Preferred electrochemical reactions on heterocycles are in particular the reaction of tetrahydrofuran to form 2-monomethoxytetrahydrofuran and 2,5-dimethoxytetrahydrofuran or of furan to form dimethoxy-dihydrofuran and the reaction of N-methyl-2-pyrrolidone to form 5-methoxy-N-methyl-2-pyrrolidone.

The present invention is now to be illustrated with reference to some examples.

EXAMPLES

Example 1

In Example 1, one possibility of producing an embodiment of an electrode according to the invention is demonstrated. A graphite substrate is furnished electrolytically with a thin (10–50 nm), metallic intermediate layer (Au, Pt, Cr) in order, under coating conditions, i.e. in the presence of a high concentration of atomic hydrogen, not to obtain undefined etching of the substrate and to achieve good bonding of the diamond layer. The preseeding of the electrodes is performed in a suspension of nanodiamond powder in ethanol in an ultrasonic bath with subsequent cleaning in ethanol. For the coating process, a high activation of the gas phase must be achieved by filament temperatures of from 2000° C. to 2400° C., in which case, on the substrate side, the temperatures are to be no higher than 850° C. owing to the metallic intermediate layer. Here, the filament diameters, the filament spacings and the respective spacings between the filaments and the substrate are adapted appropriately. The gas phase, which consists of about 99% molecular hydrogen, is admixed with sufficient trimethyl borate so that the ratio to methane does not exceed 1:1, preferably the ratio is 1:2. The process pressure is set to 10–50 mbar. To ensure pore-freeness, the coating process is repeated several times, after cooling the pressure in the coating chamber being increased at least to atmospheric pressure. As a result of the pressure increase, loose particles are removed from the substrate surface. In the case of rough substrate surfaces, a repeated cleaning in ethanol preferably takes place. Another possibility is to carry out a 2nd seeding step instead of a cleaning step. Firstly, owing to seeding with the suspension, cleaning of the surface takes place. Secondly, when ultrasonic baths are used, all particles leading to pores are mechanically removed. The additional seeding also ensures that all sites over which diamond has not yet grown are furnished with diamond nuclei for the second coating process. A further coating process is then carried out in which the pores which are still present are sealed.

For the examples below, an undivided electrolysis cell of 70 cm$^3$ having a heatable forced circulation was used, a diamond-coated electrode according to Example 1 and a stainless steel electrode as cathode. Tempering was performed by an intensive cooler connected to the electrolysis circuit.

Example 2
Oxidation of Cyclohexene:

5 g of cyclohexene and 50 g of MTBS are dissolved in 40 g of methanol and 160 g of THF and electrolyzed at a current density of 11 mA/cm$^2$, for example, using an electrode produced according to Example 1. After an applied charge quantity of 5 F, 61% of monomethoxycyclohexene are obtained.

Example 3
Oxidation of Cyclohexanone:

5 g of cyclohexanone and 3 g of KI and 1 g of water are dissolved in 191 g of MeOH and electrolyzed at a current density of 11 mA/cm$^2$, for example, using an electrode produced according to Example 1. After an applied charge quantity of 3.4 F, 89% of dimethoxycyclohexanol are obtained.

Example 4
Oxidation of Dimethylformamide (DMF):

5 g of DMF and 6 g of sodium benzene sulfonate. are dissolved in 190 g of methanol and electrolyzed at 25° C. in 11 mA/cm$^2$, for example, using an electrode produced according to Example 1. After an applied charge quantity of 2 F, 96.4% of N-monomethoxymethyl-N'-methylformamide were obtained.

Example 5
Oxidation of Tetrahydrofuran (THF):

5 g of THF and 6 g of sodium bromide were dissolved in 190 g of methanol and electrolyzed at a current density of 11 mA/cm$^2$, for example, using an electrode produced according to Example 1. After an applied charge quantity of 8 F, 12% of monomethoxytetrahydrofuran were obtained. Using sodium benzene sulfonate, a significantly better yield of monomethoxytetrahydrofuran was obtained, at 44% after 8 F.

We claim:
1. An electrode comprising a substrate and a diamond layer applied to said substrate, wherein the diamond layer applied is pore-free and obtained by a process comprising:
    a) cleaning the surface of the substrate;
    b) seeding the surface of said substrate at a high diamond nucleation density;
    c) coating the surface of said substrate with diamond.
2. The electrode as claimed in claim 1, wherein said substrate comprises one or more materials selected from the group consisting of suicides, carbides and borides.
3. The electrode as claimed in claim 1, wherein said substrate comprises a core and an intermediate layer applied onto said core.
4. The electrode as claimed in claim 3, wherein said core is graphite, titanium, molybdenum, gold or silicon, or combinations thereof.
5. The electrode as claimed in claim 3, wherein said intermediate layer is Au, Pt or Cr, or combinations thereof.
6. The electrode as claimed in claim 3, wherein said core is a carbide-forming metal.
7. The electrode as claimed in claim 1, wherein said diamond layer comprises boron in a range from 10 ppm to 2000 ppm.
8. The electrode as claimed in claim 1, wherein said diamond layer comprises boron in a range from 50 ppm to 1000 ppm.
9. The process for the electrochemical reaction of at least one organic compound in which the at least one organic compound is brought into contact with an electrode as claimed in claim 1.
10. The process as claimed in claim 9, wherein the reaction is oxidation, acyloxylation or dimerization of at least one aromatic compound; alkoxylation or hydroxylation of at least one carbonyl compound; oxidation of at least one alcohol and/or of at least one carbonyl compound to at least one carboxylic acid; decarboxylation of carboxylic acids; functionalization of at least one amide; or reduction, oxidation or functionalization of at least one heterocyclic compound.
11. The electrode as claimed in claim 1, wherein said diamond layer has a thickness in the range of from 1 $\mu$m to 50 $\mu$m.
12. The electrode as claimed in claim 1, wherein said diamond layer has an area up to 300,000 mm$^2$.
13. The electrode as claimed in claim 1, wherein said diamond layer comprises boron in a range from 10 ppm to 10,000 ppm.
14. A process for producing a diamond-coated electrode comprising a substrate and a diamond layer thereon, comprising:
    a) cleaning the surface of said substrate;
    b) seeding the surface of said substrate at a high diamond nucleation density;
    c) coating the surface of said substrate with diamond.
15. The process as claimed in claim 14, wherein step c) is repeated at least once.

16. The process as claimed in claim 15, wherein step c) is repeated a multiplicity of times.

17. The process as claimed in claim 15, or 16, wherein step a) is carried out after each repetition of step c).

18. The process as claimed in claim 14, wherein step b) is repeated at least once, and said surface of said substrate being cleaned prior to each repetition of step b).

19. The process for the electrochemical reaction of at least one organic compound, in which the at least one organic compound is brought into contact with an electrode produced by a process as claimed in claim 14.

20. The process as claimed in claim 19, wherein the reaction is oxidation, acyloxylation or dimerization of at least one aromatic compound; alkoxylation or hydroxylation of at least one carbonyl compound; oxidation of at least one alcohol and/or of at least one carbonyl compound to at least one carboxylic acid; decarboxylation of carboxylic acids; functionalization of at least one amide; or reduction, oxidation or functionalization of at least one heterocyclic compound.

21. The process as claimed in claim 14, wherein step b) is repeated a multiplicity of times, said surface of said substrate being cleaned prior to each repetition of step b).

22. The process as claimed in claim 14, wherein said substrate is mechanically roughened prior to step a).

23. The process as claimed in claim 14, wherein said seeding is at a diamond nucleation density $\geq 10^{10}/cm^2$.

24. The process as claimed in claim 14, wherein said seeding is at a diamond nucleation density in a range of from $10^{11}/cm^2$ to $10^{13}/cm^2$.

25. The process as claimed in claim 14, wherein said substrate is arranged vertically during step c).

26. The process as claimed in claim 14, wherein step b) is carried out with diamond powder in a size range of from 5 nm to 100 nm.

* * * * *

UNITED STATES PATENT AND TRADEMARK OFFICE
CERTIFICATE OF CORRECTION

PATENT NO.      : 6,533,916 B1                                    Page 1 of 1
DATED           : March 18, 2003
INVENTOR(S)     : Puetter et al.

It is certified that error appears in the above-identified patent and that said Letters Patent is hereby corrected as shown below:

<u>Title page,</u>
Item [45] and the [*] Notice, should read as follows:

-- [45]  **Date of Patent: *Mar. 18, 2003**

[*]  Notice:  This patent issued on a continued prosecution
                application filed under 37 CFR 1.53(d) and is
                subject to the twenty year patent term provisions
                of 35 U.S.C. 154(a)(2).

Subject to any disclaimer, the term of this
                patent is extended or adjusted under 35 U.S.C.
                154(b) by 0 days. --

Signed and Sealed this

Twenty-second Day of July, 2003

JAMES E. ROGAN
*Director of the United States Patent and Trademark Office*